United States Patent
Karb et al.

(10) Patent No.: US 10,137,647 B2
(45) Date of Patent: Nov. 27, 2018

(54) METHOD AND DEVICE FOR MANUFACTURING THREE-DIMENSIONAL FIBER FABRICS AND COMPONENT PREFORMS MADE OF FIBRES IN TWO STEPS

(71) Applicant: Compositence GmbH, Leonberg (DE)

(72) Inventors: Ingo Karb, Leonberg (DE); Volker Witzel, Loechgau (DE)

(73) Assignee: COMPOSITENCE GMBH, Leonberg (DE)

( * ) Notice: Subject to any disclaimer, the term of this patent is extended or adjusted under 35 U.S.C. 154(b) by 536 days.

(21) Appl. No.: 14/758,070

(22) PCT Filed: Dec. 24, 2013

(86) PCT No.: PCT/EP2013/003940
§ 371 (c)(1),
(2) Date: Jun. 26, 2015

(87) PCT Pub. No.: WO2014/102015
PCT Pub. Date: Jul. 3, 2014

(65) Prior Publication Data
US 2015/0328843 A1    Nov. 19, 2015

(30) Foreign Application Priority Data

Dec. 28, 2012 (DE) .................. 10 2012 025 297

(51) Int. Cl.
*B29C 70/34* (2006.01)
*B29C 70/56* (2006.01)
(Continued)

(52) U.S. Cl.
CPC ............ *B29C 70/342* (2013.01); *B29B 11/16* (2013.01); *B29C 70/34* (2013.01); *B29C 70/56* (2013.01);
(Continued)

(58) Field of Classification Search
CPC ..... B29C 70/34; B29C 70/342; B29C 70/345; B29C 70/543; B29C 70/56; B29C 70/222; B29C 70/207; B29C 70/541
See application file for complete search history.

(56) References Cited

U.S. PATENT DOCUMENTS

| 2,964,442 | A | | 12/1960 | Gunnar |
| 3,115,678 | A | * | 12/1963 | Rollin .................. B29C 51/145 264/322 |

(Continued)

FOREIGN PATENT DOCUMENTS

| DE | 3003666 A | 8/1981 |
| DE | 3027655 A | 9/1981 |

(Continued)

OTHER PUBLICATIONS

English translation of International Search Report for parent application No. PCT/EP2013/003940.
(Continued)

*Primary Examiner* — Jason L Lazorcik
(74) *Attorney, Agent, or Firm* — J-Tek Law PLLC; Jeffrey D. Tekanic; Scott T. Wakeman

(57) ABSTRACT

Methods for manufacturing three-dimensional fiber fabrics and three-dimensional component preforms include clamping at least two edge regions of an overall convex body made a fiber fabric and then reshaping at least one to-be-reshaped region of the overall convex body into a concave region. Devices for manufacturing three-dimensional fiber fabrics and three-dimensional component preforms include a workpiece carrier for supporting the overall convex body, a clamping device that clamps the at least two edge regions of the overall convex body and a re-molding tool that re-shapes the at least one to-be-reshaped region of the overall convex body into the concave region.

15 Claims, 9 Drawing Sheets

(51) Int. Cl.
  *B29B 11/16* (2006.01)
  *B29K 101/10* (2006.01)
  *B29K 105/08* (2006.01)
(52) U.S. Cl.
  CPC .. *B29K 2101/10* (2013.01); *B29K 2105/0809* (2013.01)

(56) References Cited

U.S. PATENT DOCUMENTS

| | | | |
|---|---|---|---|
| 4,432,716 A | 2/1984 | Kiss | |
| 4,943,222 A * | 7/1990 | Nathoo | B28B 7/12 264/511 |
| 5,134,002 A | 7/1992 | Vallier | |
| 5,344,687 A | 9/1994 | Grimnes | |
| 5,597,435 A * | 1/1997 | Desautels | B29C 33/30 156/245 |
| 5,645,677 A | 7/1997 | Cahuzac et al. | |
| 6,054,003 A | 4/2000 | Bak et al. | |
| 6,114,012 A * | 9/2000 | Amaoka | B29C 70/30 244/119 |
| 6,585,842 B1 | 7/2003 | Bompard et al. | |
| 8,580,060 B2 | 11/2013 | Bech | |
| 8,663,526 B2 | 3/2014 | Duqueine et al. | |
| 9,718,233 B2 * | 8/2017 | Karb | B29C 55/02 |
| 2003/0133691 A1 | 7/2003 | Levert et al. | |
| 2004/0021247 A1* | 2/2004 | Habisreitinger | B29C 70/467 264/161 |
| 2004/0043196 A1* | 3/2004 | Willden | B29C 43/12 428/174 |
| 2005/0139324 A1 | 6/2005 | Meyer | |
| 2005/0268832 A1 | 12/2005 | Beneventi et al. | |
| 2006/0017200 A1* | 1/2006 | Cundiff | B29C 70/44 264/511 |
| 2006/0169396 A1 | 8/2006 | Joern | |
| 2008/0302912 A1* | 12/2008 | Yip | B29C 43/10 244/119 |
| 2009/0202789 A1 | 8/2009 | Wagner et al. | |
| 2009/0229760 A1 | 9/2009 | Hamlyn et al. | |
| 2010/0126652 A1 | 5/2010 | Joern et al. | |
| 2010/0170628 A1 | 7/2010 | Yoshikawa et al. | |
| 2010/0206994 A1 | 8/2010 | Barber | |
| 2011/0000608 A1 | 1/2011 | Bech | |
| 2011/0083605 A1 | 4/2011 | Vermilyea et al. | |
| 2011/0086199 A1 | 4/2011 | Duqueine et al. | |
| 2011/0104364 A1 | 5/2011 | Chen | |
| 2011/0104432 A1 | 5/2011 | Duqueine et al. | |
| 2011/0115124 A1 | 5/2011 | Barlag | |
| 2011/0148007 A1 | 6/2011 | Piepenbrock et al. | |
| 2011/0291325 A1* | 12/2011 | Mattia | B29C 70/462 264/294 |
| 2012/0073730 A1 | 3/2012 | Nieuwenhove et al. | |
| 2012/0119405 A1* | 5/2012 | Weber | B29C 33/10 264/101 |
| 2012/0247651 A1 | 10/2012 | Nieuwenhove et al. | |
| 2013/0101694 A1* | 4/2013 | Theinert | B29B 11/16 425/383 |
| 2013/0174969 A1 | 7/2013 | Karb et al. | |
| 2013/0175723 A1 | 7/2013 | Luebbering et al. | |
| 2014/0035195 A1* | 2/2014 | Gottinger | B29B 11/16 264/258 |
| 2014/0041795 A1* | 2/2014 | Gottinger | B29C 70/382 156/212 |
| 2014/0103571 A1* | 4/2014 | Karb | B29B 11/16 264/229 |
| 2014/0103585 A1* | 4/2014 | Coxon | B29C 70/446 264/544 |
| 2014/0131914 A1* | 5/2014 | Gottinger | B29B 11/16 264/163 |
| 2014/0375112 A1* | 12/2014 | Werner | B29C 70/34 301/63.109 |

FOREIGN PATENT DOCUMENTS

| | | |
|---|---|---|
| DE | 4115831 A | 11/1992 |
| DE | 10005202 A | 11/2000 |
| DE | 19922799 A1 | 11/2000 |
| DE | 10035237 C1 | 9/2001 |
| DE | 102004038706 A1 | 9/2005 |
| DE | 102010015199 A1 | 10/2011 |
| DE | 102010030009 A1 | 12/2011 |
| DE | 102010041179 A1 | 3/2012 |
| DE | 102012010497 A1 | 12/2012 |
| EP | 0415870 A | 3/1991 |
| EP | 1584462 A | 10/2005 |
| EP | 1724098 A | 11/2006 |
| EP | 2159310 A | 3/2010 |
| EP | 2314435 A2 | 4/2011 |
| EP | 2433784 A1 | 3/2012 |
| GB | 2452298 A | 3/2009 |
| GB | 2467417 A | 8/2010 |
| JP | H03287824 A | 12/1991 |
| WO | 2008056980 A | 5/2008 |
| WO | 2009077581 A2 | 6/2009 |
| WO | 2009158262 A1 | 12/2009 |
| WO | 2012035105 A | 3/2012 |
| WO | 2012136391 A1 | 10/2012 |

OTHER PUBLICATIONS

English translation of Written opinion for parent application No. PCT/EP2013/003940.
Unpublished U.S. Appl. No. 14/394,182.
Office Action dated Sep. 20, 2013 from the German Patent & Trademark Office in priority DE application No. 10 2012 025 297.8, including translation of substantive portions thereof.
Office Action from the Japanese Patent Office dated Aug. 30, 2016 in counterpart Japanese application No. JP 2015-550013,and translation of substantive portions thereof.
Office Action from the Chinese Patent Office dated May 11, 2016 in related Chinese application No. 201380068845.8, and machine translation of substantive portions thereof.
Office Action dated Aug. 4, 2016 in U.S. Appl. No. 14/115,552.

\* cited by examiner

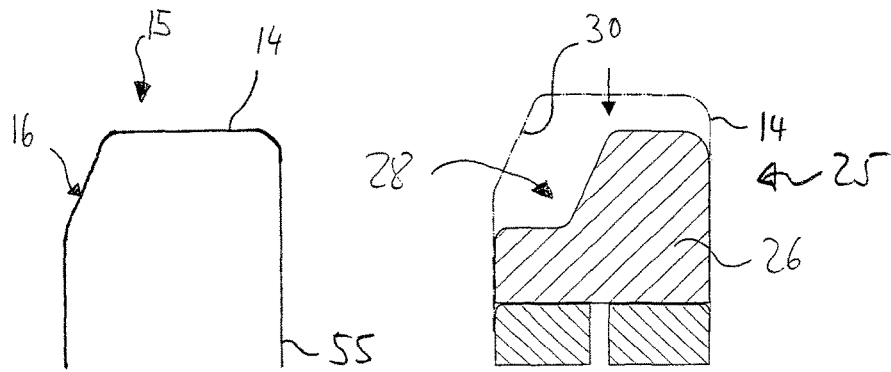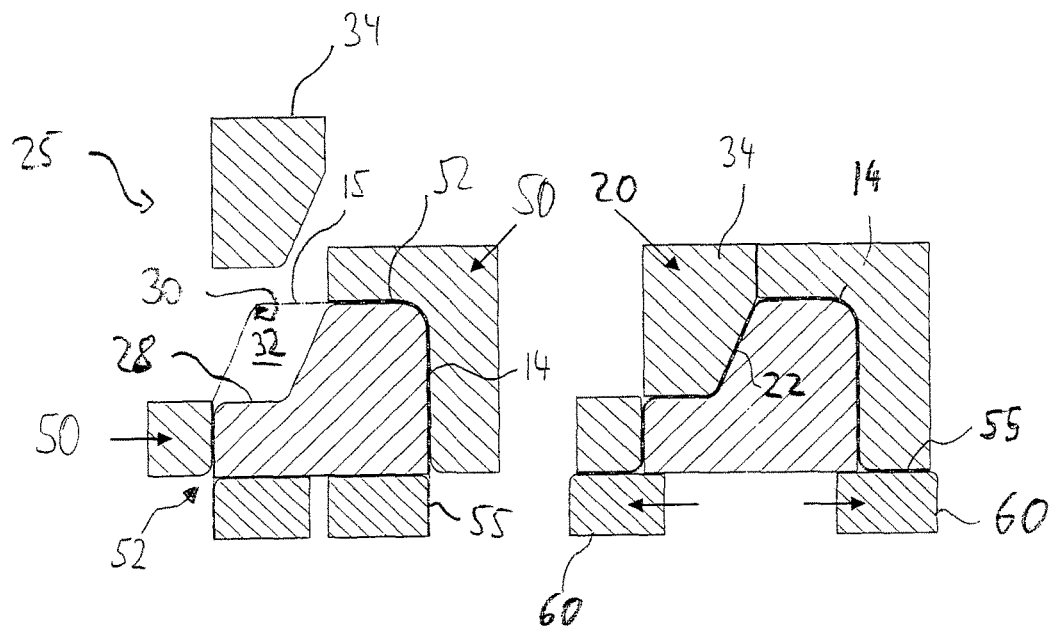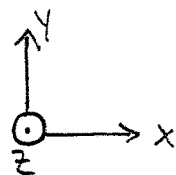
Fig. 3

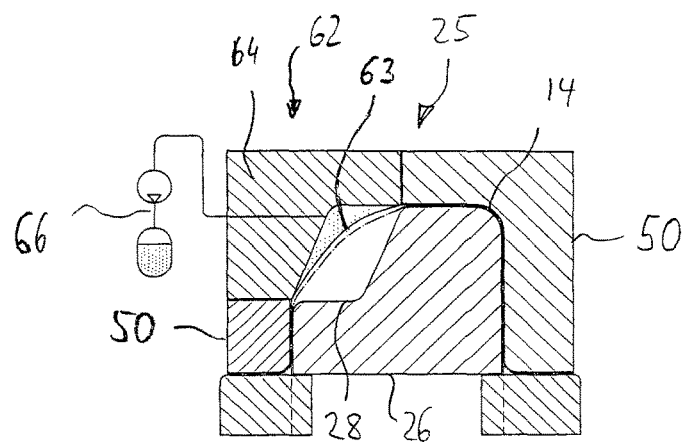
a)
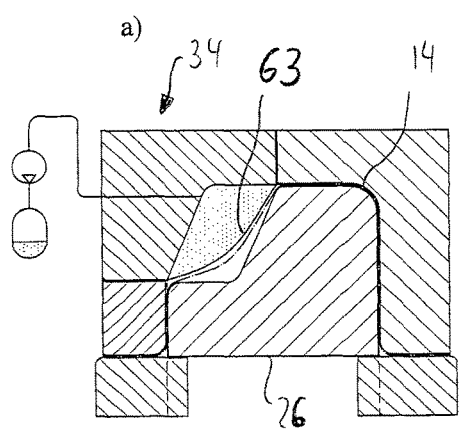
b)
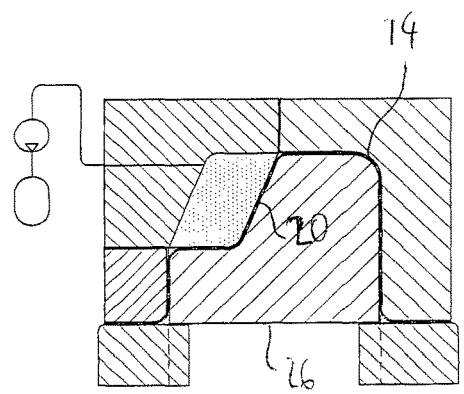
c)
Fig. 7

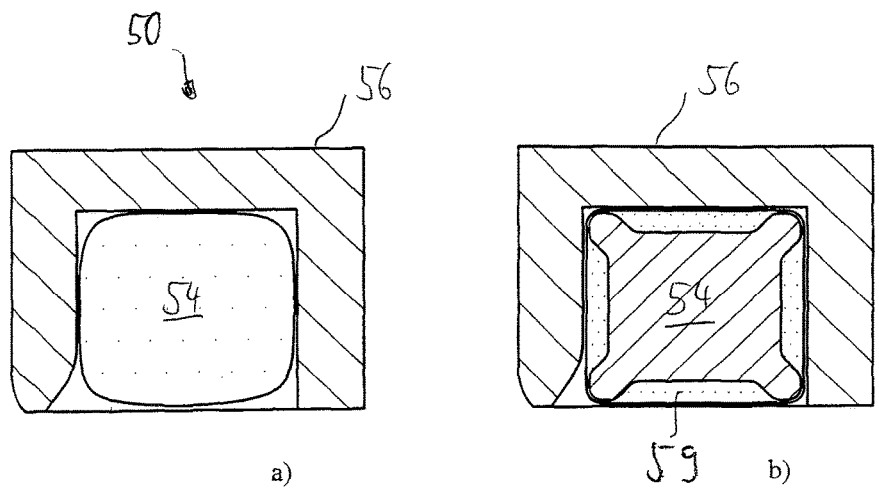
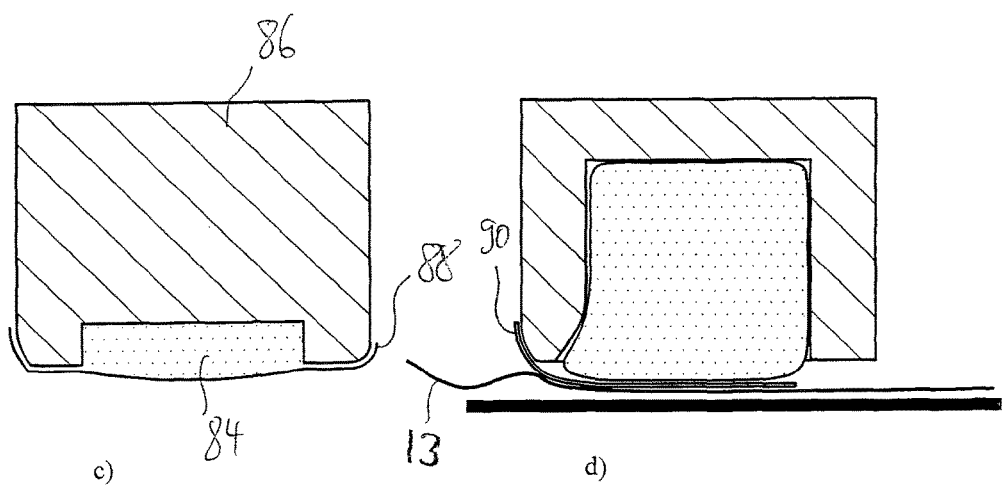
Fig. 11

METHOD AND DEVICE FOR MANUFACTURING THREE-DIMENSIONAL FIBER FABRICS AND COMPONENT PREFORMS MADE OF FIBRES IN TWO STEPS

CROSS-REFERENCE

This application is the U.S. national stage of International Application No. PCT/EP2013/003940 filed on Dec. 24, 2013, which claims priority to German patent application no. 10 2012 025 297.8 filed on Dec. 28, 2012.

TECHNICAL FIELD

The invention relates to methods and devices for manufacturing three-dimensional fabrics and component preforms from fibers.

RELATED ART

Nowadays, in the manufacturing of three-dimensional preforms and prestacks directly from endless fibers, fibers are unwound from bobbins and laid on a core or workpiece carrier by using various means. The contour of the core or workpiece carrier resembles the component contour in dimension and shape. As a rule, the laying takes place under low or high tension so that the fibers span concave regions in the workpiece carrier, as long as they are not held in such concave regions by special measures.

Such a method is known, for example, from DE 10 2010 015 199 A1.

Representative measures for holding the fibers in a concave region include, for example, bonding (adhering) of the to-be-laid fibers on the workpiece carrier or on already laid fibers so that the fibers do not detach from the concave region under tensioning. Such a measure requires that a pressing tool be present, in order to press the fibers into the concave zones and hold them pressed until sufficient adhesion by material bonding, for example, by gluing. However, in particular with small-radius-of-curvature concave zones, this can not be accomplished using universally-shaped pressing tools, such as, e.g., pressing rollers, since their elasticity would be exceeded. Moreover, the process speed is limited by the need to wait for the formation of the material bond.

A further possibility is to provide a plurality of crossing fibers, which when simultaneously applied ensure an abutting of the fabric in the concave region due to the tension on the crossing fibers. Such a measure requires that at least one of these fibers assumes a purely convex path along the workpiece carrier in order to, by using its radial tension that arises by the tensioning, press other fibers having a concave path onto (against) the surface of the workpiece carrier. For this purpose, crossovers of the fibers are necessary, wherein the fiber(s) having a convex path must lie on the fibers having the concave path at least at a few crossings. This means that the convex-extending fiber can extend at a greater distance to the surface of the workpiece carrier.

Alternatively the fiber layers can be suctioned and held on the workpiece carrier by subjecting the fibers to a negative pressure. In this method the fibers must by guided into the vicinity of the surface of the workpiece carrier in order to be suctioned by an air stream through the surface of the workpiece carrier onto the surface and to be held thereon.

All above-mentioned measures can lead to losses in productivity or in design freedom of the component or be subject to restrictions in their application. Therefore, as a rule, shapes having a purely convex shape are manufacturable faster and with higher process reliability than shapes that include both convex and concave shapes.

SUMMARY

In one aspect of the present teachings, it is possible to manufacture, without the above-mentioned disadvantages, three-dimensional fiber fabrics or preforms or prestacks having both convex and concave regions.

Methods and devices for manufacturing such three-dimensional fiber fabrics or preforms or prestacks having both convex and concave regions are disclosed herein.

Methods according to the present teachings generally involve two steps. In the first step, loose fibers are shaped into a body having at least one convex region. This body has an unfinished geometry or primary shape. Preferably the body is an open, overall convex profile (open profile body). In an open profile, such as, for example, a U-shaped profile, normally a surface that is convex, as viewed from one side, is concave as viewed from the other side. Therefore in the following description, when a convex body is discussed, it is assumed that its upper side or outer side is convex as viewed from above or outside (e.g., the visible side when placed on a workpiece carrier). For a body that is formed from a yarn fabric, the outer side is intended to be the side of the body that is not laid on (does not direct contact) a workpiece carrier designed to form the body with the primary shape.

In a cross-sectional view, such a "convex region" or "convex" is curved exclusively in a positive (left) or negative (right) direction (depending on the viewing angle), or it is exclusively formed from positively or negatively curved sections and flat sections. Here and in the following, "concave region" shall be understood to mean a region that, in a cross-sectional view, is curved exclusively in the direction opposite to the convex region, or that is formed exclusively from sections curved in the opposite direction and from flat sections.

In the second step, the primary shape is re-shaped into a secondary shape or finished geometry, which, as viewed in the laying direction of the fibers or in or from the same above-mentioned first direction, includes at least one concave region. Here the first direction is stationary with respect to not-reshaped regions of the body and or the reshaping devices used.

More specifically, in the primary shaping step, a primarily convex preform (or a prestack) is manufactured from endless fibers in a 3D-capable laying process for endless fibers; optionally, additives may be included in or with the fibers. "Primarily convex" means the body includes at least one convex region (convex surface). The preform is a fiber fabric comprised of, e.g., rovings, fibers, or filaments, e.g., made of carbon, glass, basalt, or aramid, which are referred to as reinforcing fibers; the reinforcing fibers are formed into a composite material by bonding with a matrix material, e.g., a synthetic material, in another upstream or downstream process step. A roving is a yarn that is comprised of a plurality of filaments made from the fiber material, which could be referred to as the actual fibers. Such a roving can be comprised of a few, e.g., 8 or 10, filaments, up to, e.g., 50,000 filaments. In this description, the term "fiber" preferably refers to a roving.

The geometry of the thus-initially-formed body is referred to as an unfinished geometry or primary shape, since it already has similarities to the intended (final or finished)

component in that it may have similar dimensions, a similar shape, or even a similar deep drawing ratio. Preferably a surface spanned by a cross-section of the primary shape is larger than the corresponding surface spanned by the cross-section of the intended (final or finished) shape.

The fibers that form the unfinished geometry have a similar or preferably identical fiber length as those that are needed later for the finished geometry. The unfinished geometry is preferably purely convex with respect to the to-be-laid fibers, so that all fibers of the preform (prestack) can be laid rapidly and in a defined manner in the primary shaping process.

The derivation (pre-planning) of the unfinished geometry (primary shape) from (in view of) the finished geometry (secondary shape), that is, the calculating of how the unfinished geometry should look in order to be able to form the desired finished geometry from it, plays an important role since it influences the necessary degrees of freedom of the fibers in the reshaping of the unfinished geometry into the finished geometry. Computer programs are preferably used for this purpose (e.g., CAD, FEM programs, and mathematical optimization algorithms).

The preferred goal for the selecting of the shape of the unfinished geometry is that the unfinished geometry at least partially, preferably entirely, contains the identical fiber lengths as are needed for the finished geometry. Here "identical fiber lengths" means that the segment or region of a fiber that forms a particular to-be-reshaped (convex) region of the unfinished geometry is identical to the segment or region of the same fiber that forms the corresponding reshaped region of the finished geometry. If this applies to all fibers, the surface area of the convex region that is to be reshaped into the concave region is also preferably equal to the surface area of the concave region after the reshaping. It is thus possible to obtain the finished-geometry preform purely by bending the unfinished-geometry preform and without distortion of the fiber orientation.

If this goal cannot be completely achieved, the unfinished geometry must include, for example, minimally shorter fiber lengths. In other words, the regions or segments of the fibers that form the unfinished geometry have a length that is minimally shorter than the length of the segments or regions of the same fibers that form the finished geometry after the reshaping. In this case, during the reshaping into the finished geometry, fibers that actually had to be stretched (however, stretching of the above-mentioned fibers is only possible to a very limited extent) are redrawn from the edge. Since a corresponding reserve is preferably held at the edge, a "constricting" of the body during reshaping can be avoided. In other words, the edge of the primary body includes a reserve region of fibers, which reserve region is preferably used up (pulled into the finished geometry/shape) after (as a result of) the reshaping due to the slippage.

However, the slippage or redrawing of fibers carries the risk that fibers or fiber lengths, which are in contact with the slipping fiber or fiber layer, are also pulled along, which can lead to a slight distortion of the fiber orientations. It is therefore advantageous if the length differences of the fibers in the unfinished- and finished-geometry are as small as possible. To avoid or to reduce a pulling-along of the fibers, the fibers in the edge region of the unfinished geometry are fixed, or held, or clamped before the reshaping. Here the fixing is effected such that individual (some) fibers can slip, but the remaining fibers are fixed.

The reshaping of the preform, which is convex with reference to the fibers contained therein, into the desired convex/concave shape of the intended (final or finished) component happens after the primary shaping process has been completed or each time after a sub-step of the primary shaping process has been completed. Here the preform (primary shape) or portions of the preform, which portions are not reshaped or are only reshaped in later stages, are fixed. Preferably at least two regions, which oppose each other, are fixed, wherein the to-be-reshaped region lies between the at least two opposing fixed regions as viewed in a cross-section.

The fixing can be effected by clamping of the preform between inflexible or elastic molded parts, by suctioning using a vacuum, or by material bonding. For example, the fibers may be fixed by using a pressurized bag (balloon) or tube or by using a sintered metal surface that is subjected to a vacuum.

The reshaping itself is effected, for example, by the driving (submerging or pushing) of one or more dies into the preform. The dies can be fixed-shape or also can be designed from an elastic material or as a bag that is fillable with fluid media and is expandable. Here a counterform (complementary surface) may be necessary, into which the to-be-deformed region of the preform is pressed by the die(s).

Therefore a three-dimensional body can be manufactured from a fiber fabric using the present method, which three-dimensional body includes at least one concave region and wherein the fibers of the fiber fabric are disposed with respect to one another in the body in a defined and reproducible manner.

The advantage of this method is clear in particular in comparison to conventional shaping methods, in which three-dimensional shells are generated from flat fiber semi-finished products. Depending on the depth of the to-be-manufactured shape, there may be significant fiber-length differences between the projection of the component shape onto the semi-finished-product plane and the three-dimensional shape. Significant distortion of the orientations arises during the so-called draping (deep drawing) of the flat textile semi-finished product into the component shape. Sometimes, this process is not possible in a crease-free manner and thus severely limits the design freedom of components at a reasonable cost.

The workpiece carrier for the unfinished geometry and the tool(s) for the reshaping or post-shaping (e.g., a re-molding tool (post-shaping tool) or a re-molding device (post-shaping device)) can be separate components. However, the reshaping can also be effected on the workpiece carrier for primary shaping. This workpiece carrier is then supplemented with a tool upper part or includes a flexible region. In the following, a "flexible" region means a region or a surface that is variably deformable.

The workpiece carrier, the lower part, and/or the upper part of the re-molding device can also have a variable geometry (flexible regions) in partial regions. Here the variation can be effected by sliders made from inflexible or elastic material or by introducing or exhausting a fluid medium in a deformable device, such as, e.g., a bag.

If the fabric contains, in addition to fibers, additives that effect a cohesion of the fibers, the effect of this cohesion must thus be reversed or reduced during the secondary shaping. With resins or binders that are thermally activated/reactivated, this happens by heating of the preform.

As further variants (embodiments) of the present teachings, foils, membranes, or mesh materials, which are used for the protection of the fibers, the controlling of the residual distortion, and/or for preventing the adhesion of binder-coated fibers to the tool, can be inserted between the preform and the shaping tools in the secondary shaping.

In one variant (embodiment) of the primary shaping process, one or more concave zones are directly introduced during the laying of the fibers on the workpiece carrier. For this purpose, the fibers are initially fixed on the workpiece carrier and span outward over the concave zones. A die presses the not-yet fixed fibers into the concave zone and remains in this position until the fibers become sufficiently fixed on the workpiece carrier. If necessary, the fibers are held in the concave zones by a negative pressure or by material bonding so that the die can be removed again.

The above-mentioned expandable body or bag, which is fillable with compressed air or with pressurized liquid, for clamping the preform is, for example, a tube. By using such an expandable body, the same clamping forces, which primarily depend on the filling pressure and the contact surface of the expandable body with the material to be clamped, can always be applied in a wide tolerance range of the thickness of the material to be clamped. When using inflexible or elastic clamping units, the usual thickness tolerances in fiber layers can lead to a local variation of the clamping force and thus to the risk of unsteady holding forces and tensions in the fabric. A tube shape or body shape, which can make nearly complete contact with the material to be clamped, merely with a slight increase of the filling pressure, is especially advantageous. On the one hand, the clamping force can then be varied linearly with the filling pressure since the contact surface remains substantially the same. Furthermore, it is advantageous that non-substantial proportions of the available maximum filling pressure are needed for the making of the contact to the material to be clamped. Thus a large pressure range is available, up to the maximum pressure, for increasing the clamping force.

Such an expandable body is preferably embodied as a rectangular pressure-tube or bag. This can also be achieved by shaping an initially round tube using an insert to stretch it into the rectangular shape. A minimum requirement for the clamping tube is at least that it has a surface in the shape of the clamping surface (e.g., a flat surface). The above-described tube can also be formed by stretching a membrane over a pressurized space having any shape.

As a further alternative for the fixing of fibers, the fixing can be provided by using a vacuum or a negative pressure, which is applied in pores of a sintered metal surface. The negative pressure in the pores is usually generated by applying a vacuum or a negative pressure to a chamber below the sintered metal surface so that a uniformly-large air flow through all regions of the surface is achieved. A pressure gradient then exists within the sintered metal, wherein the maximum negative pressure of the pressure gradient is located in the interior of the sintered metal body. Ambient pressure prevails outside of the sintered metal body and outside of the fiber layer.

The fixing of thin objects such as paper, foils, or substances by using a vacuum is known in the art nowadays. However, to maintain the negative pressure necessary for the fixing, it is important that only small amounts of air can flow into the system adjacent to the material to be suctioned. That is, if the material to be fixed covers only a part of the permeable fixing surface, air can flow in via the not-covered regions and this leads to a decrease of the negative pressure in the fixing surface.

To fix the fiber layers, as is required in the above-stated primary shaping and, in particular, in the secondary shaping, this is of particular importance when conventional vacuum suction tables are used, since the rovings, yarns, etc. are laid on the fixing surface in a stripwise or yarnwise manner and thus a sufficient fixing cannot be achieved before the fixing surface is completely covered. Also, with a different number of fiber lengths, greatly different permeabilities and thus locally different-strength fixing sometimes result. In order to now obtain a uniform permeability of all regions with only a minimal dependence on the degree of coverage, the permeability must be throttled in such a manner that the local permeability resistance has a low dependence on the coverage of the fixing surface. This can be effected, for example, by the use of porous materials, such as, e.g., woven fabrics or non-woven materials.

Only smooth-surface materials, without micro-roughness having undercuts, are useful as a support for carbon fibers since otherwise the fine filaments could hook-in and cause an obstruction when being lifted off again.

Surprisingly it has been discovered that extremely fine pore sintered metals fulfill these conditions. Due to the structure of the surface, which is comprised of pressed, ball-shaped particles made from metal, there are no undercuts, into which the filaments could hook-in. With very small particle sizes, the surface can be designed substantially smooth, and the permeability resistance is substantially high even with small material thicknesses, in order to achieve an equalization of the permeability of the fixing surface.

BRIEF DESCRIPTION OF THE DRAWINGS

Further advantages and useful characteristics of the present teachings follow from the description of exemplary embodiments with reference to the Figures:

in FIG. 2a), a perspective view of an exemplary workpiece carrier, and in FIGS. 2b), c), and d), different steps for forming the primary shape.

FIGS. 3a) to 3d) show different steps for forming a secondary shape from the primary shape according to a method and using a device according to the first embodiment.

FIGS. 7a) to c) show different steps for forming a secondary shape from the primary shape according to a method and using a device according to the third embodiment.

FIGS. 11a) to d) show various variants of a clamping device.

DETAILED DESCRIPTION OF THE INVENTION

The forming of a three-dimensional fiber fabric having a primary shape is depicted in an exemplary manner in FIGS.

Figure 1:
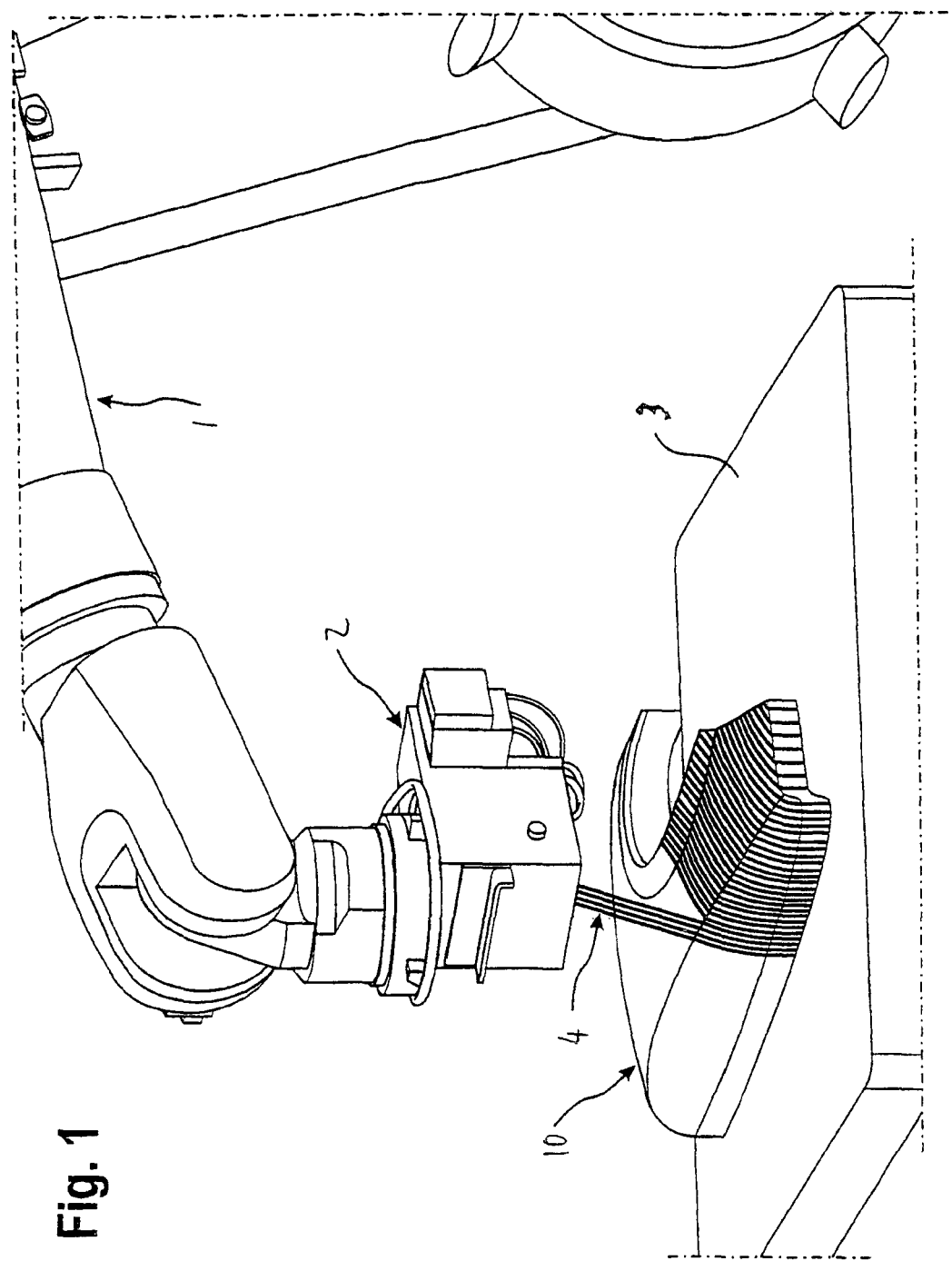
FIG. 1 shows a perspective view of an exemplary workpiece carrier and an exemplary laying device for forming a fabric body having a primary shape.

1 and 2 a) to d). FIG. 1 shows a robot 1, to which a laying head 2 is attached. A workpiece carrier 10 is held on a support 3 for the workpiece carrier 10. In FIG. 1 it is schematically shown that the laying head 2 is configured to lay a fiber set 4 on the workpiece carrier 10. In FIG. 1 only four fibers in the fiber set 4 are shown. The fiber set 4 can include a plurality n of fibers, with n=2, 3 . . . . Preferably n=8, or n=16, or n=32.

This arrangement can be used to manufacture a three-dimensional preform (body in primary shape) for a component made from a fiber composite material. The fiber composite material is, for example, a three-dimensional multiaxial fabric (3D-MAF).

As shown in FIG. 2a), for this purpose the workpiece carrier 10 includes a workpiece shaping region 11 and an edge-fixing region 12. The workpiece shaping region 11 corresponds to the desired three-dimensional shape of the preform. Edge-fixing region 12 serves to fix the dry laid fibers 13 in (along) the edge region of the workpiece carrier 10, as will be explained in more detail below.

In FIG. 2b) the workpiece carrier 10 is shown with a first fiber layer 13a, which has been laid on the workpiece carrier 10 in a first orientation (=axial direction). As indicated in FIG. 2b), the fiber layer 13a is comprised of fibers (rovings) 13 that have been laid in this axial direction. In FIG. 2c), the same workpiece carrier 10 is shown, on which a second fiber layer 13b has been laid over the first fiber layer 13a. The fibers of the second fiber layer 13b have an orientation of −45° relative to the orientation of the first fiber layer 13a. It is shown in FIG. 2d) how a third fiber layer 13c has been laid over the second fiber layer 13b, wherein it has been laid only on a part of the workpiece carrier 10. The third layer 13c has an orientation of +45° relative to the first layer 13a and thus of 90° relative to the second layer 13b. The three layers 13a to 13c form a three-dimensional multiaxial fabric 3D-MAF 13d.

Thus a body or open profile body 14 in a primary shape 15 made from a yarn fabric results from the fibers or rovings that were laid on the first workpiece carrier 10. Since the surface of the workpiece carrier 10 is purely convex and flat, the yarns are laid while being tensioned on the surface or on other already-laid yarns such that no hollow space is formed between the yarns and the first workpiece carrier 10. This makes possible a defined and reproducible forming of the body 14 having the primary shape 15. The fibers are preferably held together by additives. The body 14 is subsequently removed from the first workpiece carrier 10. Thus the body 14 is formed in the primary shape 15 whose surface is exclusively convex.

It is noted that the body can also be manufactured by many other methods. For example, the fibers or rovings can also be manufactured using a frame in a deep drawing manner. Furthermore, concave regions can also be present in the workpiece carrier 10, which are spanned by the fabric.

FIGS. 3a) to d) show a method for reshaping a body 14, shown in cross-sectional view, having a primary shape 15, into or to a secondary shape (finished geometry) 20, which includes a reshaped region 22 that has at least one concave section as viewed from above in FIG. 3.

Figure 2:
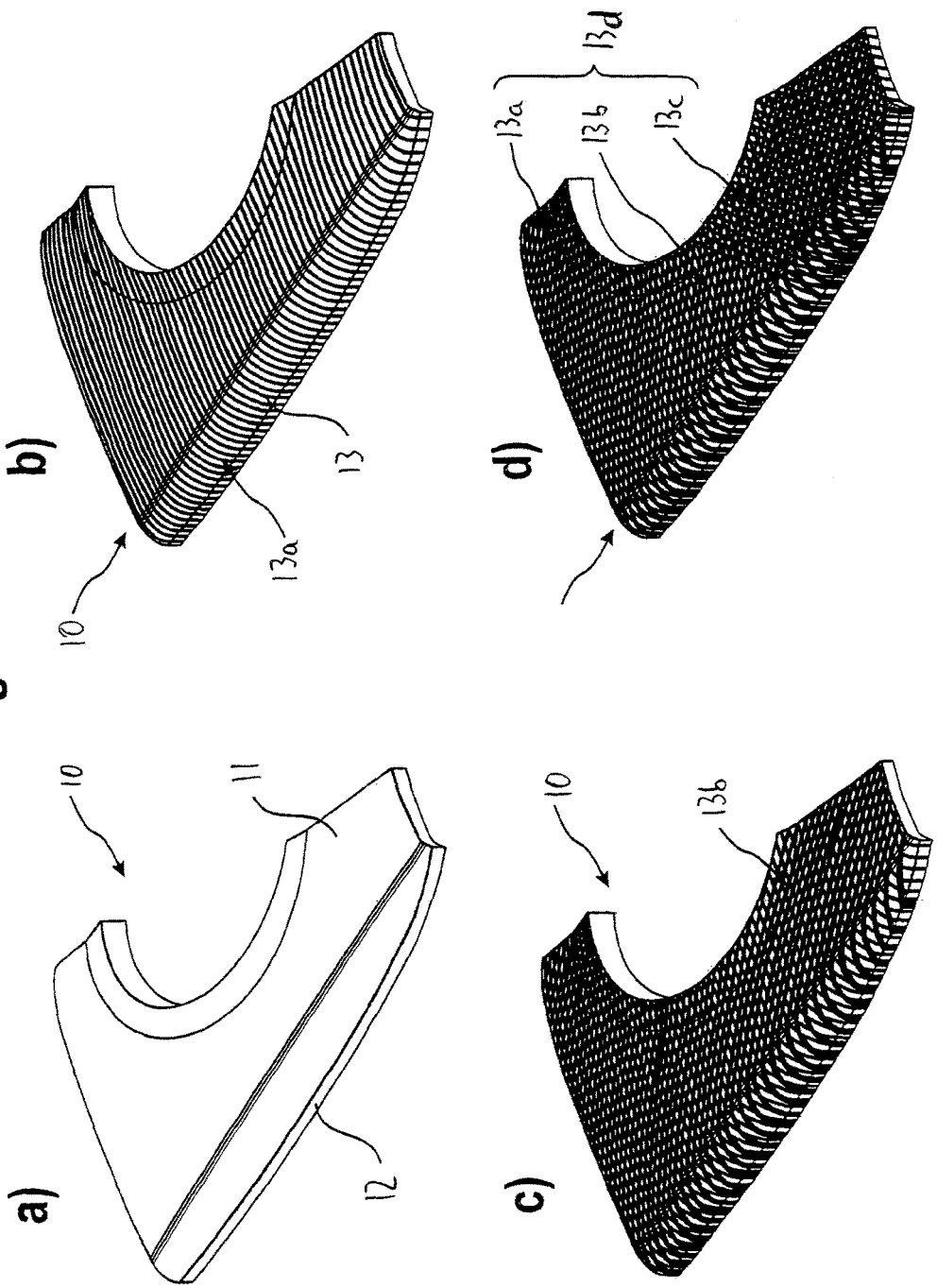
FIGS. 2a) to 2d) show.

To simplify the further description, in FIG. 3a) a cross-section of a body 14 having the primary shape 15 is shown that does not completely correspond to the cross-section of the body 14 shown in FIG. 2d). It is expressly noted that the further description also applies to a body or component 14, which has been finished as described in FIGS. 1 to 2d). The workpiece carrier 10 (shown in FIG. 2a)) for the body 14 in the primary shape 15 has, in particular, an outer contour that corresponds to the inner contour of the body 14 shown in FIG. 3a).

As shown in FIGS. 3b) to 3d), the body 14 having the primary shape shown in FIG. 3a) is reshaped into the secondary shape 20 in a re-molding (re-shaping) device 25. In this embodiment the re-molding device 25 includes a re-molding lower tool (also referred to as a re-molding positive mold, workpiece carrier, workpiece holder, or re-molding tool) 26, onto which the body 14 in the primary shape 15 is placed or laid. The re-molding lower tool 26 has a similar shape to the first workpiece carrier 10. Preferably it has, in sections thereof, the same maximum width and height as the first workpiece carrier 10, so that the body 14 can come to rest in a defined manner on the re-molding lower tool 26.

The re-molding lower tool 26 differs from the workpiece carrier 10 in that it includes a surface that includes a concave region 28.

The cross-sectional views shown in FIGS. 3b) to 3c) both show the same cross-sectional plane. This cross-sectional plane is preferably stationary with respect to the not-re-shaped regions and/or the re-molding lower tool 26. That is, the regions of the re-molding lower tool 26 intersected by the cross-sectional plane and the not-reshaped regions of the body are preferably identical.

As shown in FIG. 3c), after the laying or pushing or placing of the body 14 onto the re-molding lower tool 26, a hollow space 32 is automatically formed between the concave surface 28 of the re-molding lower tool 26 and an inner surface 30, i.e. the concave surface (or surface that includes exclusively flat, and in one of the cross-sectional views shown in FIG. 3b), positively curved, sections), facing the re-molding lower tool 26, of the body 14.

The body 14 or the to-be-reshaped convex region 16 (or the to-be-reshaped region of the body, which includes exclusively flat, and in one of the cross-sectional views shown in FIG. 3a), negatively curved, sections) of the body, which does not contact the surface of the re-molding lower tool 26, i.e., the convex region 16 of the body 14, which forms the hollow space 32, is subsequently reshaped by a die or re-molding upper tool (also referred to as a re-molding negative mold, workpiece carrier, workpiece holder, or re-molding tool) 34, which is also part of the re-molding device 25, such that the inner surface 30 of the body 14 abuts on the concave upper surface 28 of the re-molding lower tool 26. The reshaping is effected substantially exclusively by bending the body 14. That is, in this embodiment the body 14 is substantially not compressed or stretched. In this embodiment a fiber (or a fiber region), which forms the convex region 16 of the primary shape 15, has the same length as a fiber (or a fiber region), which forms the concave region 22 of the body. The to-be-reshaped convex region 16 includes exclusively convex and flat regions, and the reshaped concave region includes exclusively concave and flat regions. Alternatively a reshaped region can also be obtained from the to-be-reshaped purely convex region, which reshaped region includes concave and convex, or concave and convex and flat, regions. Also, in this case the reshaping is effected exclusively by bending. It further can be seen from the cross-section shown in FIG. 3 that the length of the contour of the sectional surface of the to-be-reshaped region 16 between the not-to-be-reshaped regions 52 of the body 14 is the same as the length of the contour of the sectional surface of the reshaped region 22 between the not-to-be-reshaped regions 52. With "thicker" bodies, this is also the case with a line, which as viewed in cross-section delimits the outer- or inner-surface, or a center line that extends through the to-be-reshaped region 16 between the not-to-be-reshaped regions.

The die 34 preferably has a shape (preferably reduced by the layer thickness of the body 14) that is complementary to the concave surface or the concave surface region 28 of the re-molding lower tool 26. That is, at least on the side(s) facing the re-molding lower tool 26, the die 34 substantially has the contour of the hollow space 32, which is delimited by the re-molding lower tool 26.

In this embodiment the concave region 28 of the re-molding lower tool 26 has the same surface area as a corresponding convex region of the surface of the first workpiece carrier 10 or a corresponding convex region 16 of the body 14. The size of the surface of the first workpiece carrier 10 preferably corresponds, at least in parts, to the size of the corresponding surface of the re-molding lower tool 26. In particular, the size of the surface regions, by which the two workpiece carriers differ from each other and which are used for forming the primary- and secondary-shape, is the same size.

In this embodiment the re-molding lower tool and the re-molding upper tool are each preferably formed as inflexible molded parts.

The secondary shape or finished geometry 20 is formed by the reshaping process. That is, a convex region 16 of the body 14 is reshaped into a concave region 22 (see FIG. 3*d*)).

As can be seen from FIG. 3*c*), prior to the reshaping, the body 14 is fixedly clamped using a holding- or fixing-device 50, which here is also part of the re-molding device 25. Here a holding- or clamping- or fixing-region 52 of the body 14 is fixedly clamped in between the fixing device 50 and the re-molding lower tool 26. In this embodiment the fixing device 50 is manufactured, for example, from inflexible molded parts. During reshaping of the body 14, the fixing region 52 is preferably not reshaped and is therefore also referred to as not-to-be-reshaped region 52. The body 14 is preferably fixedly held on both or all sides of the hollow space 32 or of the to-be-reshaped region 16. It is thereby ensured that, during the reshaping process, the body 14 cannot slip on the re-molding lower tool 26.

Furthermore, as can be seen in FIG. 3*d*), the end edges 55 of the open profile body 14 can be reshaped by additional reshaping tools 60, for example, for further forming of concave regions.

The thus-formed body 14 having the secondary shape 20 corresponds to the final-formed finished-geometry preform, which subsequently can be further processed.

Figure 4:
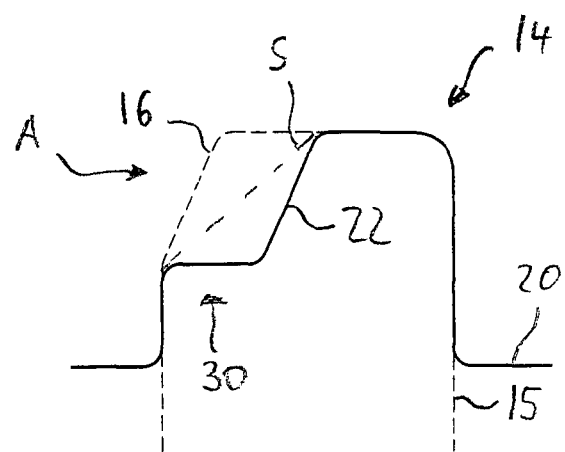
FIG. 4 shows a schematic cross-sectional view of the primary shape according to the first embodiment and the secondary shape formed from this primary shape.
Figure 5:
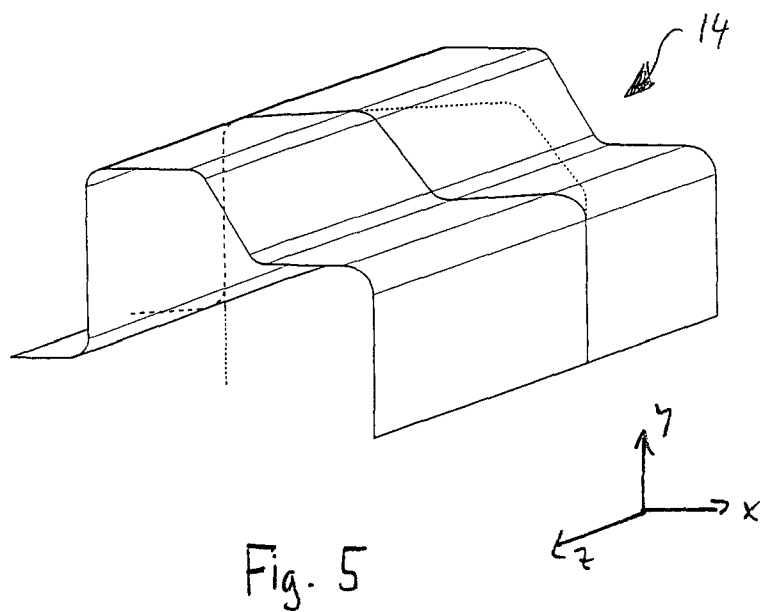
FIG. 5 shows a three-dimensional depiction of the secondary shape according to the first embodiment and of the cross-section of its underlying primary shape.

FIG. 4 shows a side plan view (or cross-sectional view) of the secondary shape 20 (solid line) and the corresponding primary shape 15 (dashed line) according to the first embodiment. FIG. 5 shows a corresponding three-dimensional view. As can be clearly seen from the Figures, the size of the surface of the body 14 in the primary shape 15 is the same as the size of the surface of the body 14 in the secondary shape 20.

Figure 6:
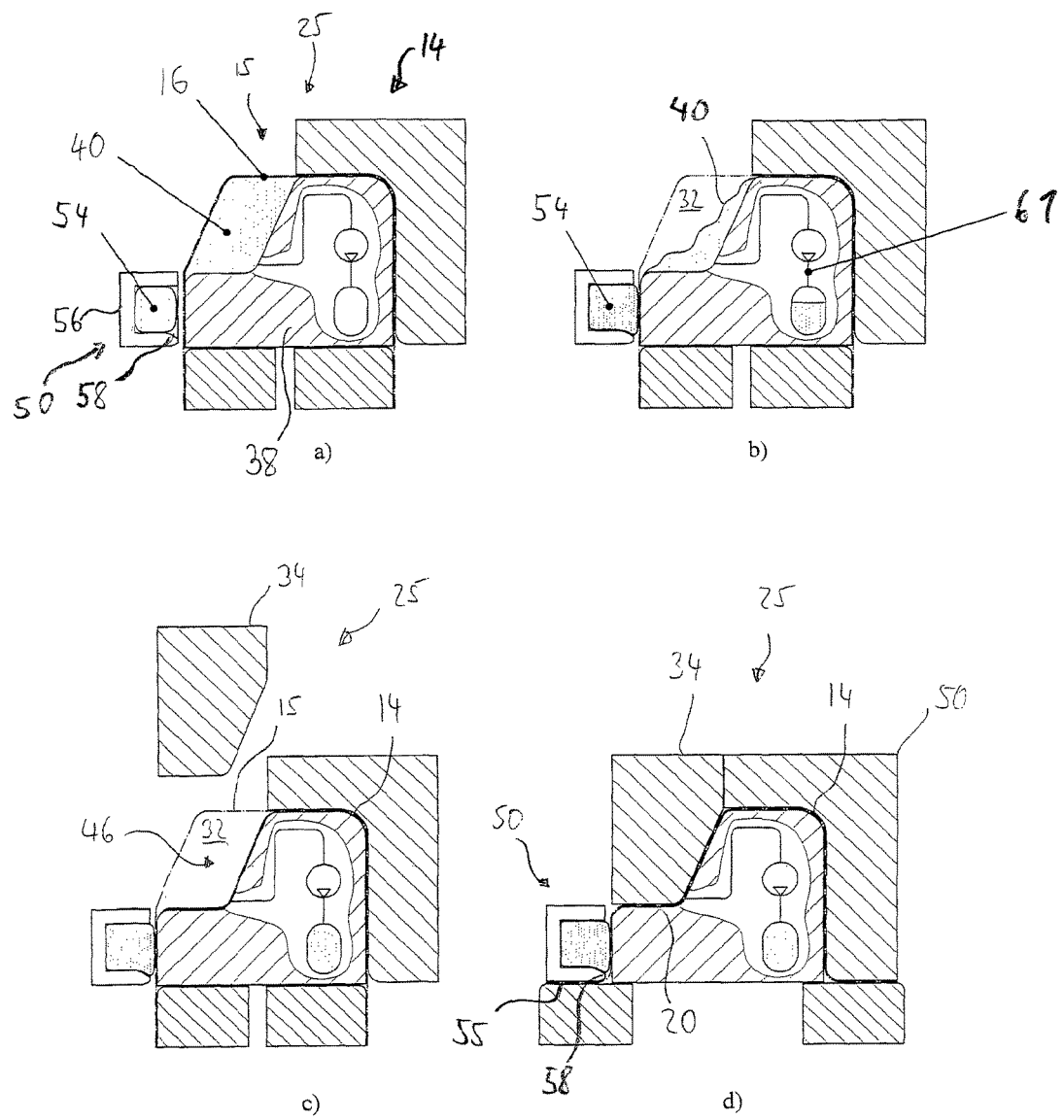
FIGS. 6a) to d) show different steps for forming a secondary shape from a primary shape according to a method and using a device according to the second embodiment.

FIG. 6 shows cross-sectional views of a second embodiment of the present invention. For simplification, the same components in this and the further embodiments are referred to using the same reference numbers and are not described again. As can be seen in FIG. 6*a*), in this embodiment the workpiece carrier 38 is formed integrally with the re-molding device 25 or the re-molding tool or the re-molding lower tool 26. That is, only an integral workpiece carrier 38 is provided, from or on which both the primary shape 15 and the secondary shape 20 are formed. In this embodiment the integral workpiece carrier 38 includes a flexible (or variable) region 40. Using the flexible region 40, the outer contour of the workpiece carrier 38 can assume, on the one hand, the outer contour of the workpiece carrier 10 according to the first embodiment, and on the other hand the outer contour of the re-molding lower tool 26 according to the first embodiment. As is further depicted in FIG. 6*a*), the workpiece carrier 38 initially has a convex shape or surface, on which the fibers are laid, for forming the convex primary shape 15. The fibers are thus laid on the integral workpiece carrier 38, wherein the flexible region 40 has a convex shape, so that a body 14 is formed in a primary shape 15 having a convex surface 16 corresponding to the first embodiment.

Alternatively the primary shape 15 can be formed, as in the first embodiment, using a separate workpiece carrier 10. In this case the primary shape 15 is subsequently laid or placed on the integral workpiece carrier 38 according to the second embodiment.

In a next step the body 14, as also in the first embodiment, is held or clamped by at least one holding device or clamping device or fixing device 50 in a fixing region 52, which is not to be reshaped into a concave region (see FIG. 6*b*)).

Subsequently the flexible region 40 of the workpiece carrier 38 is reshaped such that it has a concave surface 46. As also in the first embodiment, a hollow space 32 thereby results between the body 14 and the workpiece carrier 38 or the concave surface 46 of the workpiece carrier 38. Lastly, a re-molding upper tool 34, as is known from the first embodiment, is laid on the workpiece carrier 38 to reshape the body 14 into the secondary shape 20. Furthermore, the lower edges of the body 14 are bent over as in the first embodiment. During its reshaping, the flexible region must experience no elongation or compression, since the original surface area and the intended (final or finished) surface area are substantially equal.

In the second embodiment the fixing device 50 is configured in the form of a clamping bag. Here the clamping bag is an expandable body in the form of a tube 54 extending in the longitudinal direction z. The tube 54 is inserted into a profile 56, extending in the longitudinal direction z, which has a U-shaped cross-section perpendicular to the longitudinal direction z. The profile 56 is open towards the integral workpiece carrier 38. The profile 56 is stationary with respect to the workpiece carrier 38.

By filling the tube 54 with a fluid (e.g., gas, water, or air), the tube (tube-body) is expanded. Since the tube is surrounded on three sides by the half-open profile 56, it can only expand outward towards the workpiece carrier 38 (see FIG. 6*b*)). Due to the expansion, the body 14, which extends on the surface of the workpiece carrier 38, is clamped between the expanding or expanded tube 54 and the workpiece carrier 38. As described above, by using such a tube, it can be ensured that each individual fiber is fixedly held with substantially the same force.

By definition, the U-shaped profile 56 has two parallel-extending walls. Preferably the shape of each wall is customized to how the tube should spread out. In the present embodiment one wall 58 of the profile 56, which wall 58 is opposite of the to-be-reshaped convex region 16 of the body 14, has a bevel, so that the tube 54 can expand better in the region of the edge (end) of the wall 58 into the corner that forms during the reshaping of the end edges 55 of the body 14 (see FIG. 6*d*)).

The tube 54 is connected to a device (not shown) for inflating and/or deflating.

The flexible region 40 of the integral workpiece carrier 38 is preferably formed by an expandable body in the form of a bag. The bag is connected to a device 61 (see FIG. 6*b*)) for inflating and deflating the bag. The device 61 is preferably formed by a pump, a tank, and corresponding valves. The bag is configured such that, at least when it is inflated, it assumes a defined shape. When it is deflated, its shape is substantially determined by the surface onto which it is applied.

The integral workpiece carrier 38 is formed, for example, by providing a base-workpiece carrier, whose shape corresponds to the shape of the second workpiece carrier 26 according to the first embodiment, with such a flexible region 40. The flexible region 40 is superimposed on the concave upper surface region of the base-workpiece carrier. The flexible region 40 is further configured such that, after inflating with fluid, it fills in the base-workpiece carrier or its shape such that the base-workpiece carrier and the inflated flexible region 40 together form the shape or outer contour of the first workpiece carrier 10.

FIGS. 7*a*) to *c*) show cross-sections of a third embodiment of the present invention. The cross-sectional views each show the same cross-sectional plane of not-to-be-reshaped regions of the body and/or the same cross-sectional plane of the re-molding tool.

In this embodiment the body 14 is already formed with the primary shape 15, is placed on a re-molding lower tool 26, and is fixedly held or attached using a holding device 50 made from two clamping jaws according to the first embodiment. The third embodiment differs from the first embodiment in particular in that the re-molding upper tool 34 of the re-molding device 25 in this embodiment is not formed from a die, as is shown in the first embodiment, but rather from an upper tool 62 that includes a flexible (variably deformable) region 63. The upper tool 62 is formed from a base body 64 and the flexible region 63 in the form of a bag. The base body 64 is configured such that at least one region of its inner contour corresponds substantially to the outer contour of the to-be-reshaped convex region 16 of the primary shape 15. The flexible region 63 is superimposed on the above-mentioned region of the inner contour of the base body 64. Similar to the flexible region 40 of the integral workpiece carrier 38 according to the second embodiment, the bag can be inflated and deflated by a filling device 66. The filling device 66 is preferably formed by a pump and a tank.

When the flexible region 63 is deflated, the re-molding upper tool 62 according to this embodiment can be placed onto the re-molding lower tool 26 and/or on the clamping jaws 50 and can surround the body 14 in the primary shape 15 without deforming it.

Subsequently, as shown in FIG. 7*b*), the flexible region 63 is inflated with fluid so that it expands and reshapes the body 14 or its to-be-reshaped convex region 16. The reshaping is effected here during inflation of the filled-with-fluid bag uniformly towards the concave region 28 of the surface of the re-molding lower tool 26 until the convex region 16 of the body 14 is reshaped completely into the concave secondary shape 20 corresponding to the concave contour 28 of the re-molding lower tool 26 (see FIG. 7*c*).

Figure 8:
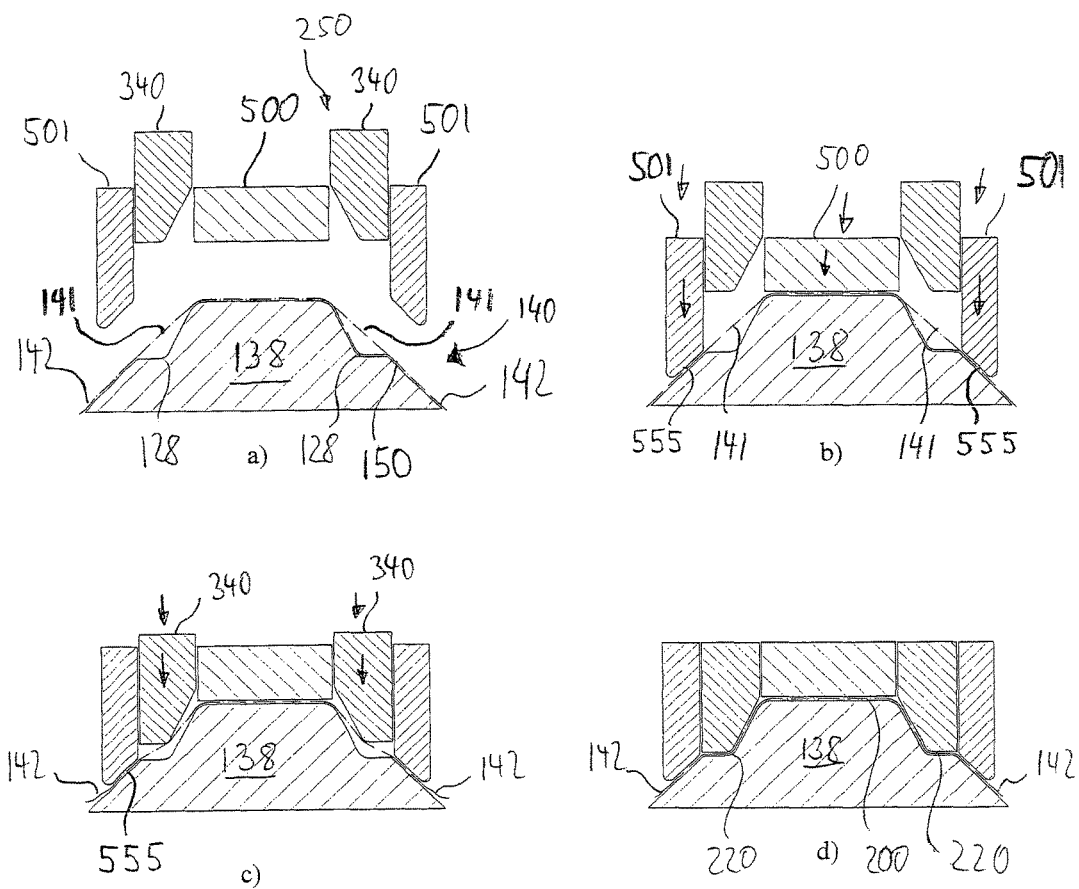
FIGS. 8a) to d) show different steps for forming a secondary shape from the primary shape according to a method and using a device according to a fourth embodiment.

FIGS. 8*a*) to *d*) show cross-sectional views of reshaping steps of a further body 140 in a primary shape 150 into a secondary shape 200 according to a fourth embodiment. The cross-sectional views each show the same cross-sectional plane of not-to-be-reshaped regions of the body and/or the same cross-sectional plane of the re-molding tool. Also in this embodiment, the primary shape 150 and the secondary shape 200 are formed by a single integral workpiece carrier 138, which simultaneously forms the re-molding lower tool of the re-molding device 250. The workpiece carrier 138 includes two concave surface regions (regions having exclusively concave or exclusively concave and flat regions) 128. During forming of the body 140 in the primary shape 150, the fibers laid under tension on the workpiece carrier 138 span these concave regions 128. The fiber regions that span the concave regions 128 are referred to as span regions or to-be-reshaped regions 141 and are substantially flat (flat regions) in this embodiment. The thus-formed body 140 having the primary shape 150 therefore includes, as also in the first to third embodiment, at least sectionally no concave regions.

In a next step the body 140 in the primary shape 150 is fixed on the workpiece carrier 138 by a fixing device. In particular, not-to-be-reshaped regions of the body 140 are in particular fixed near or around the to-be-reshaped region. Furthermore, it is preferred that, for example, regions in the center of the body 140 or the component region are first fixed, and subsequently edge regions are fixed. In the present embodiment the body 140 in the primary shape 150 is therefore first fixed by a central fixing device 500. Subsequently the end edges 555 of the body 140 are fixed by two further lateral edge fixing devices (also referred to as fixing devices) 501. In other words: regions of the body 140, which are adjacent to the span regions 141, are preferably fixed before the reshaping.

In the further steps depicted in FIGS. 8*c*) and *d*), the span regions 141 (to-be-reshaped regions) of the body 140 are reshaped using a re-molding upper tool 340 such that they assume the shape of the concave regions 128. The body 140 subsequently has the secondary shape 200. The re-molding upper tool 340 is formed here by two dies, which have a complementary shape to the concave regions 128 of the workpiece carrier 138. That is, due to the driving-in of the dies 340, the flat span regions 141 of the body are pressed-in such that they assume the shape of the concave regions 128 of the workpiece carrier 138. Due to the reshaping, reshaped regions 220 having at least one concave section are formed in or at the concave regions 128. Since in this embodiment the overall concave region 220 is formed from the flat span regions 141 between two edges of the workpiece carrier 138, which concave region 220 extends between the same edges, the concave region 220 (reshaped region) necessarily has a greater surface area than the corresponding flat region 141. Since the fibers forming the fabric or the body 140 are preferably not stretchable here, to enlarge the surface area, fibers are redrawn from an outermost edge region 142 of the body 140. The fixing by the edge-fixing devices 501 is therefore preferably only so strong that a slippage of the fibers is facilitated. When forming the body 140, the edge region 142 or the length of the fibers in the edge region is dimensioned such that the edge desired for the secondary shape can be achieved without constrictions of the secondary shape 220.

In other words: in order to make possible the reshaping of the flat (to-be-reshaped) region into the concave (reshaped) region, the surface of the flat region must be "stretched" or "elongated." Since a plastic elongation of the above-mentioned fibers is not possible, fibers that extend in the direction of the enlarging or elongation must be redrawn. With fibers that extend perpendicular thereto, the distance to the respective adjacent fiber can only be increased, i.e., the fiber density will be reduced. With fibers that extend obliquely, the particular component results proportionally.

The edge fixing devices 501 are preferably formed as a clamping bag as was described above. Using such a clamping bag, it is possible to make possible a slippage of the fibers, which must be redrawn, and simultaneously ensure that neighboring fibers, which should not be redrawn, do not slip.

Alternatively, in the embodiment shown in FIGS. 8a) to d), the reshaping process can be effected each time after the laying of an individual layer for forming the body 140 in the primary shape 150. That is, a layer of fibers (preferably unidirectional) is respectively laid, fixed, and subsequently reshaped into the secondary shape. After the reshaping, the fixing device 500, 501 and the reshaping dies 340 are removed and a further individual layer of fibers is applied, which is subsequently reshaped again after the fixing.

Thus it is made possible to carry out the reshaping into the secondary shape after each individual layer.

Figure 9:
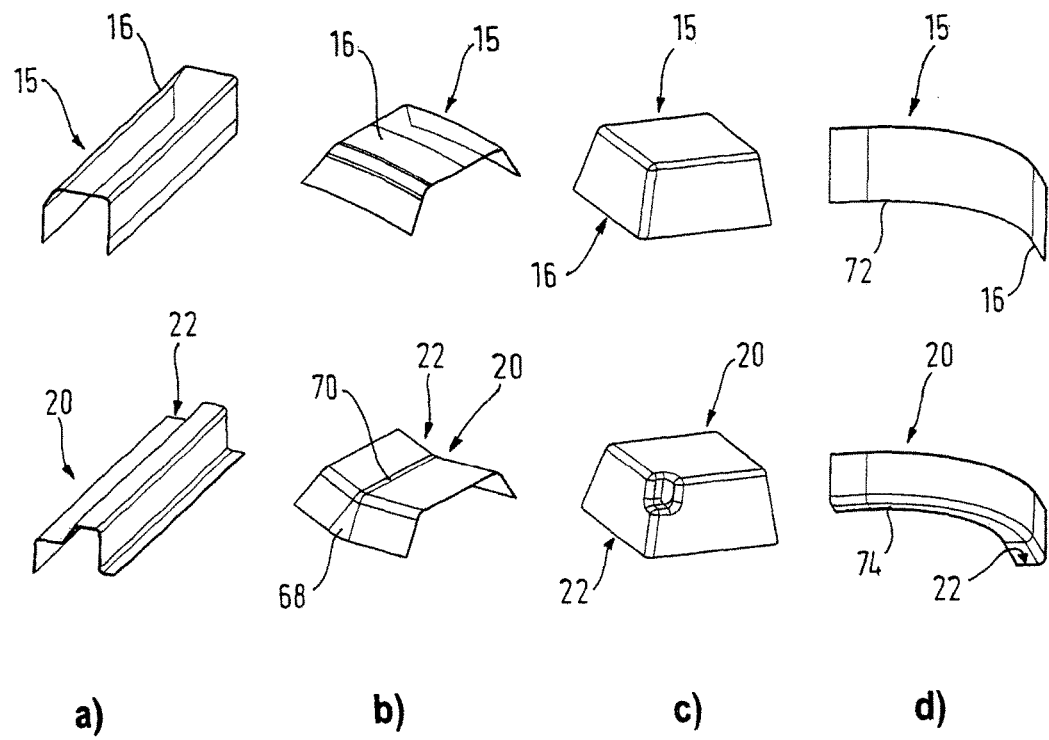
FIGS. 9a) to d) show different embodiments of primary shapes and the secondary shapes formable therefrom.

FIGS. 9a) to d) show more secondary shapes 20, which have been formed from their corresponding primary shapes 14 by one of the above-mentioned devices.

FIG. 9a) shows a body 14, which substantially corresponds to the first to third embodiment. In these bodies 14 the surface of the concave region 22 of the secondary shape 20 substantially corresponds to the surface of the convex region 16 of the primary shape 15. The same applies to the body shown in FIG. 9c). In this body, fibers are compressed together or pushed together during the reshaping process.

In the embodiment shown in FIG. 9b), the surface of the concave secondary shape 20 is larger than that of the convex primary shape 15, since an angled (V-shaped) edge region 68 must be bulged outward during the reshaping of the body 14 into the secondary shape 20 in order to prevent crease formation in a central region 70. Such an outward bulging is made possible by redrawing fibers from one or more edge regions of the body 14. As was mentioned in the introduction, for this purpose, for example, an appropriate reserve is provided during laying of the fibers for forming the body 14 in the primary shape 15. Alternatively the fibers can also be held, for example, by fiber supply rolls during the reshaping into the secondary shape 20 and only severed after the reshaping process. Alternatively, a reshaping can occur already during or after the laying of each fiber set. In this embodiment the holding device 50 should hold the fibers only so tight that a slippage of individual fibers is facilitated.

Also in the embodiment shown in FIG. 9d), it is required that the fibers in the fiber fabric of the body 14 displace within the body during the reshaping into the secondary shape 20. The lower edge 72 of the body 14 in the primary shape 15 has a greater length than the lower edge 74 in the secondary shape 20. Since the fibers are not compressible or stretchable in their longitudinal direction, in this embodiment it is preferred that none of the fibers are laid parallel to the lower edge 72 of the body 14 in the primary shape 15. During the reshaping of this primary shape 15 into the secondary shape 20, the fibers that extend perpendicular or oblique to the lower edge preferably displace together, so that crease formation is prevented. Here the fibers crossing the edge at 30-90° slip together, so that their distance to one another decreases. The local fiber quantity and thus the wall thickness of the component to be formed therefore increases.

Figure 10:
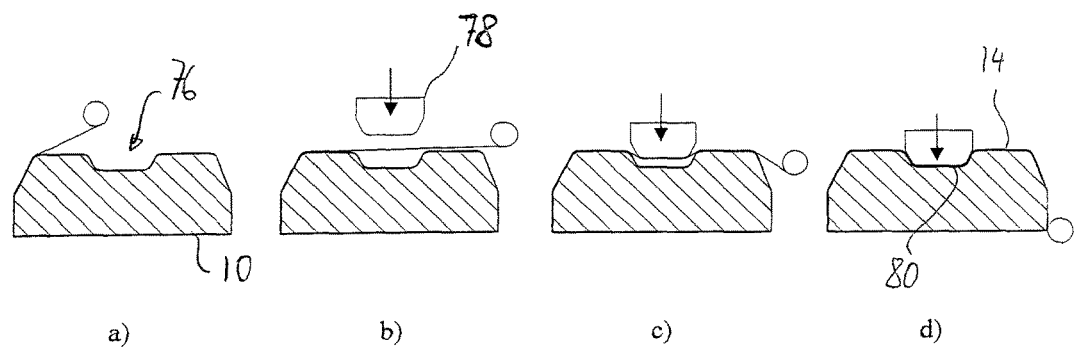
FIGS. 10a) to d) show different steps for forming a primary shape according to a further embodiment.

FIGS. 10a) to d) show a further variant of the shaping process for the primary shape 15 of the body 14. In this variant, already during forming of the body 14, one or more concave zones are formed during laying of an individual fiber or fiber set on the workpiece carrier 10. For this purpose the fibers or fiber set in this embodiment are initially fixed at one end on the workpiece carrier 10 and tensioned over a concave zone 76 formed on the surface of the workpiece carrier 26. A die 78, which preferably fits exactly into the concave zone 76 less the fiber thickness, presses the fibers, which are spanned over the concave zone 76, into the concave zone 76 such that the fibers come to rest on the surface of the concave zone. Here the additional fiber length needed for covering or resting on the concave zone is again redrawn from the laying tool (for example a fiber roll). The die remains in this position until the fibers are sufficiently fixed on the workpiece carrier 26, for example, by a material bond. After completing the driving-in of the die, the other end of the fibers can also be fixed. Alternatively or additionally the fibers can be held in the concave zone 76 by a negative pressure or a direct material bond such that the die 78 can be removed again immediately. Using this method a body 14 is formed in the primary shape, which already includes a concave region 80.

Alternatively or additionally, the die 78 can also be formed from a flexible deformable material. For example, a bag or an elastic material as was described above can be used, which exactly fits in the concave zone. Thus even for special shapes, the yarns are placed on the workpiece carrier 26 in all regions of the concave zone 76.

FIGS. 11a) to d) show variants of the fixing device 50 in the form of a clamping bag.

FIG. 11a) shows the clamping bag according to the above-described second embodiment, wherein a pressure tube 54 preferably has a rectangular cross-section, and a U-shaped profile 56 is beveled on one side such that the pressure tube, when expanding, expands more on one side in a direction parallel to the base of the U-shaped profile 56.

FIG. 11b) shows a clamping bag made of a tube 54 having an arbitrary cross-section, which is pulled through an insert 59 into the rectangular shape of the profile 56.

FIG. 11c) shows a clamping bag, which is formed from a membrane 84, which results from the spanning of a molded part 86 with an edge fixing 88.

FIG. 11d) shows a clamping bag according to the above-described second embodiment, wherein an additional covering 90 is configured to protect the tube 54 from being pulled along with the fibers that slip through the clamping.

Of course, the above-specified embodiments and/or individual features of the embodiments can be combined with one another. In particular, all described forms of clamping devices, re-molding devices, and workpiece carriers can be combined with one another.

For example, the workpiece carrier having a flexible region can be used only as a re-molding workpiece carrier, or alternatively can be used as workpiece carrier and re-molding lower tool. In various embodiments the clamping bag can also be used on both sides of the to-be-reshaped region for fixedly holding the body on a workpiece carrier. That is, a plurality of clamping bags can also be provided. The clamping bag can have very different shapes as long as it is adapted to clamping the fibers of the body. Furthermore, multiple concave regions can also be simultaneously or successively formed, also at various positions of the primary shape. The secondary shape can thus be formed in multiple steps, or multiple steps of the secondary shape can be formed.

Alternatively or in addition to the clamping device in the form of a clamping bag or a clamping profile, as described above the body can also be fixed on the workpiece carrier by a negative pressure. In particular, the workpiece carrier can be formed entirely or partially from an extremely fine pore sintered metal surface, whose pores, i.e., passages, are subjected to a negative pressure from a side of the sintered metal surface that faces away from the body. It can thereby be achieved that each individual fiber can be fixedly held by a negative pressure on the surface of the workpiece carrier.

The body 14 having the primary shape can also be formed by loose laying of fibers in a concave workpiece carrier. The re-molding upper tool and the re-molding lower tool can also each be disposed upside down. That is, the function of the above-described re-molding lower tool can also be realized by a re-molding upper tool. If the re-molding upper tool must hold the body so that it does not fall out from it, a suitable holding device can be provided (for example, a negative pressure supply).

With a pure bending of the body into the secondary shape (reshaping without slippage), the holding or fixing of the body on the re-molding lower tool serves in particular so that the bending of the fibers cannot cause the fibers to be lifted, due to the bending stiffness of the fibers, from the re-molding lower tool at fiber regions adjacent to the bending regions. In such a case the secondary shape would no longer be clearly defined.

In the case of deforming by slippage of fibers, the body in the primary shape can be formed with reserve regions at the edge. The fibers, which are redrawn, are then redrawn from this edge without the secondary shape being affected thereby. That is, the reserve regions are dimensioned such that, after the reshaping, in each case the desired secondary shape can be realized and no fibers "are missing" at the edge of the secondary shape. Alternatively the primary shape can be formed wherein the fibers, using which the primary shape is formed, still remain connected to the body in the primary shape until the end of the reshaping process into the secondary shape. That is, fibers that are unwound from rolls and used for forming the primary shape are not severed therefrom after the completion of the body with the primary shape. The body is subsequently reshaped and the fibers can slip. A severing of the fibers (cutting off) occurs after the reshaping of the body.

The fixing of individual yarn elements, rovings, or filaments on a sintered metal surface subjected to a negative pressure can also be used in other applications. This can also be claimed by itself alone.

The fixing of yarn elements, rovings, or filaments by a clamping bag can also be used in other applications. This can therefore also be claimed by itself alone.

The forming of a body 14 in the primary shape including a concave region, as was described above with reference to FIG. 10, can also be used in other applications. This can therefore also be claimed by itself alone.

The density of the fibers in the at least one convex region (16) before the deforming can be chosen such that the density of the fibers in a region (14) that is not to be deformed substantially corresponds to the density of the fibers in the at least one concave region (22) after the deforming.

Alternatively or additionally, during laying of the fibers in the convex region, a lesser fiber density can be provided than in the rest of the body. During deforming of the convex region into the concave region, the fibers can be pushed together so that the body has substantially the same fiber density overall after the deforming.

Depending on the laying sequence in respective directions, the fiber direction, and the geometric design of the outer contour of the concave outer contour of the workpiece carrier, in particular their edge region, the span regions 141 described as "flat" according to the fourth embodiment can also have an at least partially concave shape and/or concave regions.

Moreover, methods for manufacturing of three-dimensional fiber fabrics may be performed as follows:

According to a first aspect, a method for manufacturing of three-dimensional fiber fabrics and component preforms from fibers may include the following steps: reshaping of at least one overall convex region (16) of a body (14) made from a fabric of fibers into at least one reshaped region (22), which as viewed from the same viewing direction at least partially has a concave shape, wherein the surface area of the reshaped region (22) corresponds to the surface area of the at least one convex region (16) and/or at least the segment of a fiber (13), which forms the convex region (16) of the body (14) is the same segment of the fiber (13) that forms the reshaped region (22) of the body (14).

According to a second aspect, the reshaped region (22), as viewed in the same cross-sectional view of the body (14), is disposed between two non-reshaped regions (52) of the body (14).

According to a third aspect, a method for reshaping a to-be-reshaped region (16) of a fiber fabric body (14) is provided, wherein in a side view of the body (14), as is shown, for example, in FIG. 3, the to-be-reshaped region (16) passes over opposing end regions of the to-be-reshaped region (16) into the regions (fixing regions 52) of the body (14) not to be deformed in the reshaping process. During the reshaping, the deforming is performed such that, in the cross-sectional view, at least one region or segment of the to-be-reshaped region (16) moves towards a line S (see FIG. 4) extending between the opposing end regions in the cross-sectional view, wherein the size of the fiber pieces or surface of the to-be-reshaped region is the same before and after the deforming.

According to a fourth aspect, a method for deforming a to-be-reshaped region (16) of a flat, three-dimensional yarn fabric body (14) having an outer side A (see FIG. 4) and an inner side (30) is provided, which to-be-reshaped region (16), as viewed from the outer side (in FIG. 3 from above) of the yarn fabric body, has an overall convex shape before its deforming. In this method, at least a part of the to-be-reshaped region is moved during its deforming in the direction from the outer side to the inner side relative to the yarn fabric body, wherein the size of the surface of the to-be-reshaped region and the segments of the yarns forming the to-be reshaped region are identical before and after the deforming. In addition, the to-be-reshaped region passes over an at least partially enclosing edge region in the rest of the yarn fabric body, and the edge region as well as the yarn segments forming it do not change during the deforming.

According to a fifth aspect, before the deforming, the shape of the concave inner side of the to-be-reshaped region can correspond to the shape of the concave outer side of the to-be-reshaped region after the deforming.

It is explicitly stated that all features disclosed in the description and/or the claims are intended to be disclosed separately and independently from one another for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention.

The invention claimed is:

1. A method for manufacturing a three-dimensional fiber fabric or a three-dimensional component preform, comprising:

forming an overall convex body by sequentially laying sets of fibers on an overall convex surface of a workpiece carrier such that the sets of fibers extend from a first edge region of the overall convex surface to a second edge region of the overall convex surface, subsequently clamping the first and second edge regions of the overall convex body on the surface of the workpiece carrier by clamping each of the first and second edge regions between a clamping device and the workpiece carrier, and subsequently reshaping a to-be-reshaped region, which lies between the first and second edge regions of the overall convex body, into a reshaped region having at least one concave section by using a re-molding tool having a movable part that presses the to-be-reshaped region to form the reshaped region, wherein the reshaped region has a surface area that is greater than the surface area of the to-be-reshaped region and/or at least the segment of a fiber that forms the reshaped region of the body has a length that is greater than the length of the segment of the same fiber that forms the to-be-reshaped region of the overall convex body and/or in a cross-sectional view, the path of a surface of the to-be-reshaped region is represented by a first line, and in the cross-sectional view, the path of the same surface of the reshaped region is represented by a second line, the first line being shorter than the second line.

2. The method according to claim 1, wherein:
during the reshaping step, individual fibers of the fiber fabric, which extend through the reshaped region, displace in their longitudinal direction or slip from at least one of the edge regions of the overall convex body to prevent or reduce crease formation.

3. The method according to claim 2, wherein:
the clamping is effected, at least in part, by a bag or tube that is fillable with fluid and is thereby expandable, so that individual fibers between the clamping device and the workpiece carrier can slip through the clamp during the step of reshaping the to-be-reshaped region.

4. The method according to claim 3, wherein:
the re-molding tool has a flexible region, and the reshaping step is performed by deforming the flexible region between a shape complementary to the to-be-reshaped region of the overall convex body and a shape complementary to the reshaped region.

5. The method according to claim 2, wherein:
the clamping is effected, at least in part, by a sintered metal surface, whose pores are subjected to a negative pressure, so that individual fibers between the clamping device and the workpiece carrier can slip through the clamp.

6. The method according to claim 1, wherein:
the workpiece carrier includes a concave zone in the surface on which the fibers are laid to form the overall convex body, during the step of laying of the fibers on the surface of the workpiece carrier to form the overall convex body, the fibers span the concave zone under tension, and during the reshaping step, the fibers are pressed by a die, which has a shape complementary to the concave zone, onto the surface of the concave zone and are connected, bound or suctioned to the surface of the concave zone such that the die forms the concave section in the reshaped region.

7. The method according to claim 1, wherein: the re-molding tool has a flexible region, and the reshaping step is performed by deforming the flexible region between a shape complementary to the to-be-reshaped region of the overall convex body and a shape complementary to the reshaped region.

8. The method according to claim 1, wherein:
the clamping is effected, at least in part, by a bag or tube that is fillable with fluid and is thereby expandable, so that individual fibers between the clamping device and the workpiece carrier can slip through the clamp during the step of reshaping the to-be-reshaped region.

9. The method according to claim 1, wherein:
the clamping is effected, at least in part, by a sintered metal surface, whose pores are subjected to a negative pressure, so that individual fibers between the clamping device and the workpiece carrier can slip through the clamp.

10. The method according to claim 1, wherein the fibers are selected from the group consisting of carbon fibers, glass fibers, basalt fibers, and aramid fibers.

11. The method according to claim 1, wherein the sequentially laying sets of fibers comprises using a laying head attached to a robotic arm to sequentially lay the sets of fibers.

12. The method according to claim 1, wherein the sequentially laying sets of fibers comprises laying a first set of fibers such that the fibers of the first set of fibers extend in a first direction and laying a second set of fibers on the first set of fibers such that the fibers of the second set of fibers extend in a second direction at an angle to the fibers of the first set of fibers.

13. A method for manufacturing a three-dimensional fiber fabric or a three-dimensional component preform, comprising:

forming an overall convex body by sequentially laying sets of fibers on an overall convex surface of a workpiece carrier such that the sets of fibers extend from a first edge portion of the overall convex surface to a second edge portion of the overall convex surface, subsequently clamping the first and second edge portions of the generally-convex, fabric body between a clamping device and a surface of the workpiece carrier, and subsequently pushing a die or an inflatable bag against a convex region of the generally-convex, fabric body, which convex region lies between the clamped edge portions, to form a concave region, wherein, during the pushing step, one or more of the fibers longitudinally displace from at least edge of the generally-convex, fabric body by slipping between the clamping device and the surface of the workpiece carrier, and at least one of the following conditions (i)-(iii) is satisfied during the pushing step:

(i) said convex region has a first surface area, said concave region has a second surface area and the second surface area is greater than the first surface area, (ii) a segment of at least one of the fibers that partially forms said convex region and said concave region has a first length in said convex region and a second length in said concave region, the second length being greater than the first length, or (iii) in a cross-section through the convex region and the concave region, a first line along a path of a surface of the convex region is shorter than a second line along a corresponding path of a surface of the convex region.

14. The method according to claim 13, wherein the clamping step further comprises:

clamping a central portion of the overall convex body between a central fixing device and the workpiece carrier, the to-be-reshaped region of the overall convex body lying between the central portion and one of the edge regions of the overall convex body.

15. The method according to claim 14, wherein:

during the reshaping step, individual fibers of the fiber fabric, which extend through the reshaped region, displace in their longitudinal direction or slip from at least one of the edge regions of the overall convex body to prevent or reduce crease formation.

\* \* \* \* \*